United States Patent
Saigo et al.

(10) Patent No.: US 12,039,573 B2
(45) Date of Patent: Jul. 16, 2024

(54) ADVERTISEMENT APPARATUS

(71) Applicants: Takahito Saigo, Iwate (JP); Masato Ikeda, Saitama (JP)

(72) Inventors: Takahito Saigo, Iwate (JP); Masato Ikeda, Saitama (JP)

( * ) Notice: Subject to any disclaimer, the term of this patent is extended or adjusted under 35 U.S.C. 154(b) by 0 days.

(21) Appl. No.: 17/903,517

(22) Filed: Sep. 6, 2022

(65) Prior Publication Data

US 2023/0081376 A1 Mar. 16, 2023

(30) Foreign Application Priority Data

Sep. 15, 2021 (JP) .................. 2021-149935

(51) Int. Cl.
*G06Q 30/0251* (2023.01)
*G06Q 30/0241* (2023.01)

(52) U.S. Cl.
CPC ..... *G06Q 30/0271* (2013.01); *G06Q 30/0261* (2013.01); *G06Q 30/0276* (2013.01)

(58) Field of Classification Search
CPC ........... G06Q 30/0271; G06Q 30/0261; G06Q 30/0276

(Continued)

(56) References Cited

U.S. PATENT DOCUMENTS 10,992,796 B1 * 4/2021 Dintenfass .............. H04L 67/52
2010/0063889 A1 * 3/2010 Proctor, Jr. ............. H04L 63/20
705/26.1

(Continued)

FOREIGN PATENT DOCUMENTS

JP 2014-44699 3/2014
JP 2018-169646 11/2018

(Continued)

OTHER PUBLICATIONS

Corey Braccialini, Online Advertising: EvDisplay Ads, 2021 (https://web.archive.org/web/20210831220900/https://mailchimp.com/marketing-glossary/display-ads/) or (https://mailchimp.com/marketing-glossary/display-ads/) (Year: 2021).*
Notice of Reasons for Refusal dated Jan. 18, 2022 in corresponding Japanese Patent Application No. 2021-149935, with English translation.
Written Amendment dated Feb. 25, 2022 in corresponding Japanese Patent Application No. 2021-149935, with English translation.

(Continued)

*Primary Examiner* — Tarek Elchanti
(74) *Attorney, Agent, or Firm* — WENDEROTH, LIND & PONACK, L.L.P.

(57) ABSTRACT

Provided is an advertisement apparatus including a unit configured to acquire first user information collected by a first application and first user identification information in association with each other; a unit configured to acquire second user information collected by a second application and second user identification information in association with each other; a unit configured to store predetermined first user identification information, predetermined second user identification information, and user terminal identification information in association with each other; a unit configured to integrate the first user information associated with the predetermined first user identification information and the second user information associated with the predetermined second user identification information; a unit configured to create advertisement information based on an analysis result obtained by analyzing the integrated user information; and a unit configured to provide notification of advertisement information by designating the user terminal identification information.

8 Claims, 7 Drawing Sheets

(58) Field of Classification Search
USPC .............. 705/14.58, 21.1; 725/32; 348/150
See application file for complete search history.

(56) References Cited

U.S. PATENT DOCUMENTS

| | | | |
|---|---|---|---|
| 2011/0078726 A1* | 3/2011 | Rosenberg ....... | H04N 21/23424 725/32 |
| 2011/0199486 A1* | 8/2011 | Moriya .................. | G06Q 30/02 348/150 |

FOREIGN PATENT DOCUMENTS

| | | |
|---|---|---|
| JP | 2020-74219 | 5/2020 |
| WO | 2020/105198 | 5/2020 |

OTHER PUBLICATIONS

Written Opinion dated Feb. 25, 2022 in corresponding Japanese Patent Application No. 2021-149935, with English translation.
Decision to Grant a Patent dated Apr. 5, 2022 in corresponding Japanese Patent Application No. 2021-149935, with English translation.
Divisional Application issued Feb. 25, 2022 in Japanese Patent Application No. 2021-149935 with English translation.
Notice of Reasons for Refusal dated May 17, 2022 in Japanese Patent Application No. 2022-027670 with English translation.
Written Opinion dated Jul. 6, 2022 in Japanese Patent Application No. 2022-027670 with English translation.
Decision to Grant a Patent dated Oct. 11, 2022 in Japanese Patent Application No. 2022-027670 with English translation.

* cited by examiner

| | 270 | 320 | 330 |
|---|---|---|---|
| | FIRST USER IDENTIFICATION INFORMATION | SECOND USER IDENTIFICATION INFORMATION | USER TERMINAL IDENTIFICATION INFORMATION |
| | A1B2C3D4 | E5F6G7H8 | H9I10J11K12 |
| | ... | ... | ... |
| | L13M14N15O16 | L13M14N15O16 | L13M14N15O16 |
| | ... | ... | ... |

FIG. 4

ADVERTISEMENT APPARATUS

BACKGROUND OF THE INVENTION

1. Technical Field

The present invention relates to a technique for notifying a user terminal of advertisement information and verifying an effect of the advertisement information.

2. Description of the Related Art

An advertisement is to actively widely advertise information on a product or service to the public, and is performed for promoting sales of the product or service. Conventionally, an advertisement related to the product or service has been frequently performed, but it has been difficult to implement an effective advertisement and verify an effect of the advertisement with high accuracy.

Under such circumstances, technology development for enhancing an effect of an advertisement is actively performed. For example, JP 6125700 B1 proposes a technology for appropriately determining an advertisement to be distributed, and JP 6026682 B1 proposes a technology for acquiring and accumulating information on a customer and information on a product purchased in a real shop in association with each other.

SUMMARY OF THE INVENTION

However, in the above-described conventional technology, there is a problem that it is not possible to provide notification of an advertisement that is considered to be highly effective and verify an effect of the advertisement in consideration of a current state of a user and a preference tendency of the user.

Therefore, in view of the above problem, an object of the present invention is to provide an advertisement apparatus capable of providing notification of an advertisement that is considered to be highly effective and verifying an effect of the advertisement in consideration of a current state of a user and a preference tendency of the user.

An aspect of an advertisement apparatus disclosed herein includes: a first information acquisition unit configured to acquire first user information which is unique information of a user related to one organization and is collected by a first application for sales promotion provided by the one organization installed in a user terminal, and first user identification information for identifying the user in association with each other, from the user terminal; a second information acquisition unit configured to acquire second user information which is unique information of the user related to the other organization and is collected by a second application for sales promotion provided by the other organization installed in the user terminal, and second user identification information for identifying the user in association with each other, from the user terminal; an association information storage unit configured to store predetermined first user identification information, predetermined second user identification information, and user terminal identification information that are pieces of information for specifying the user terminal when notification of an advertisement is provided by designating the user terminal and an application installed in the user terminal in association with each other; a user information integration unit configured to integrate the first user information associated with the predetermined first user identification information and the second user information associated with the predetermined second user identification information; an advertisement information creation unit configured to create advertisement information for providing notification of one advertisement application capable of receiving the advertisement installed on the user terminal identified by the user terminal identification information associated with the predetermined first user identification information and the predetermined second user identification information based on an analysis result obtained by analyzing the first user information and the second user information integrated by the user information integration unit; and an advertisement information notification unit configured to provide notification of the advertisement information created by the advertisement information creation unit by designating the user terminal identification information and the one advertisement application.

An aspect of the disclosed advertisement apparatus can provide notification of an advertisement that is considered to be highly effective and verify an effect of the advertisement in consideration of a current state of a user and a preference tendency of the user.

DETAILED DESCRIPTION

An embodiment of the present invention will be described with reference to the drawings.

Figure 1:
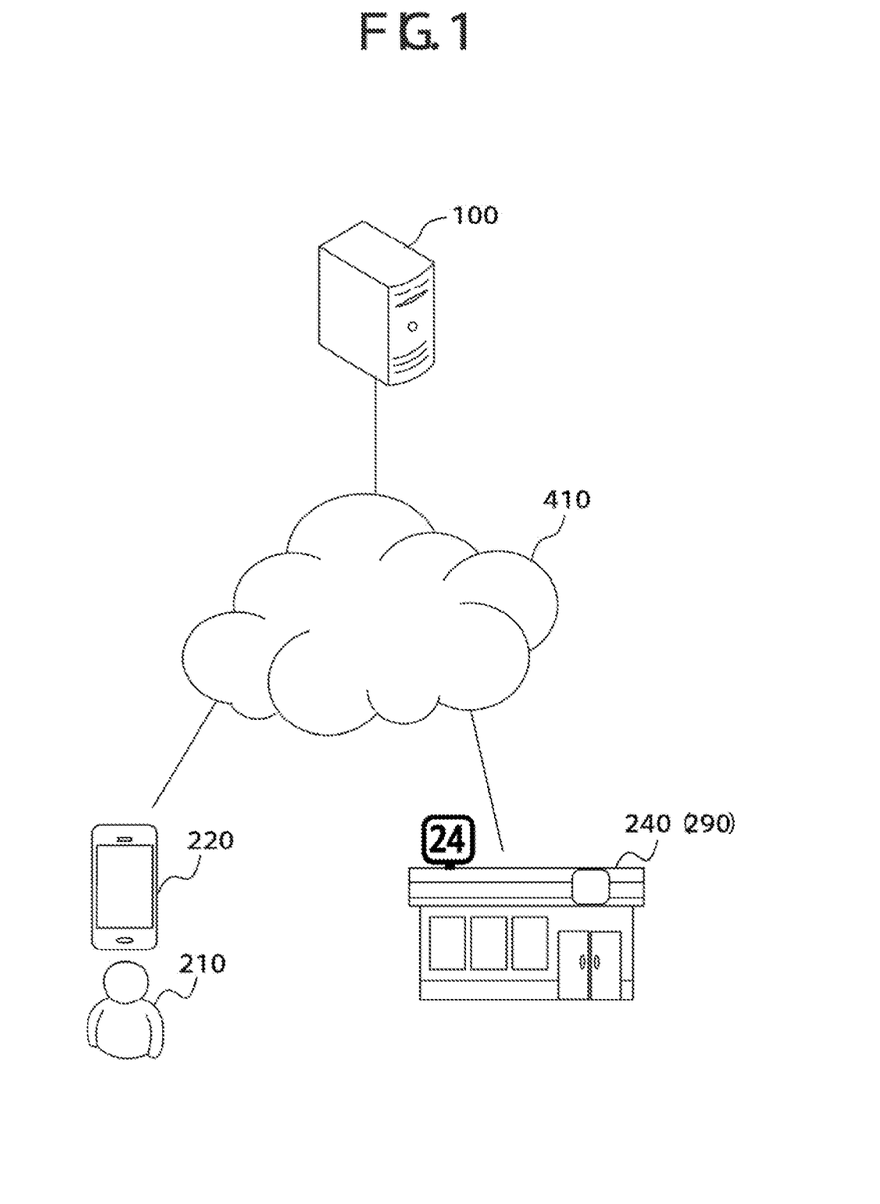
FIG. 1 is a diagram for describing an outline of an advertisement apparatus according to the present embodiment.
Figure 2:
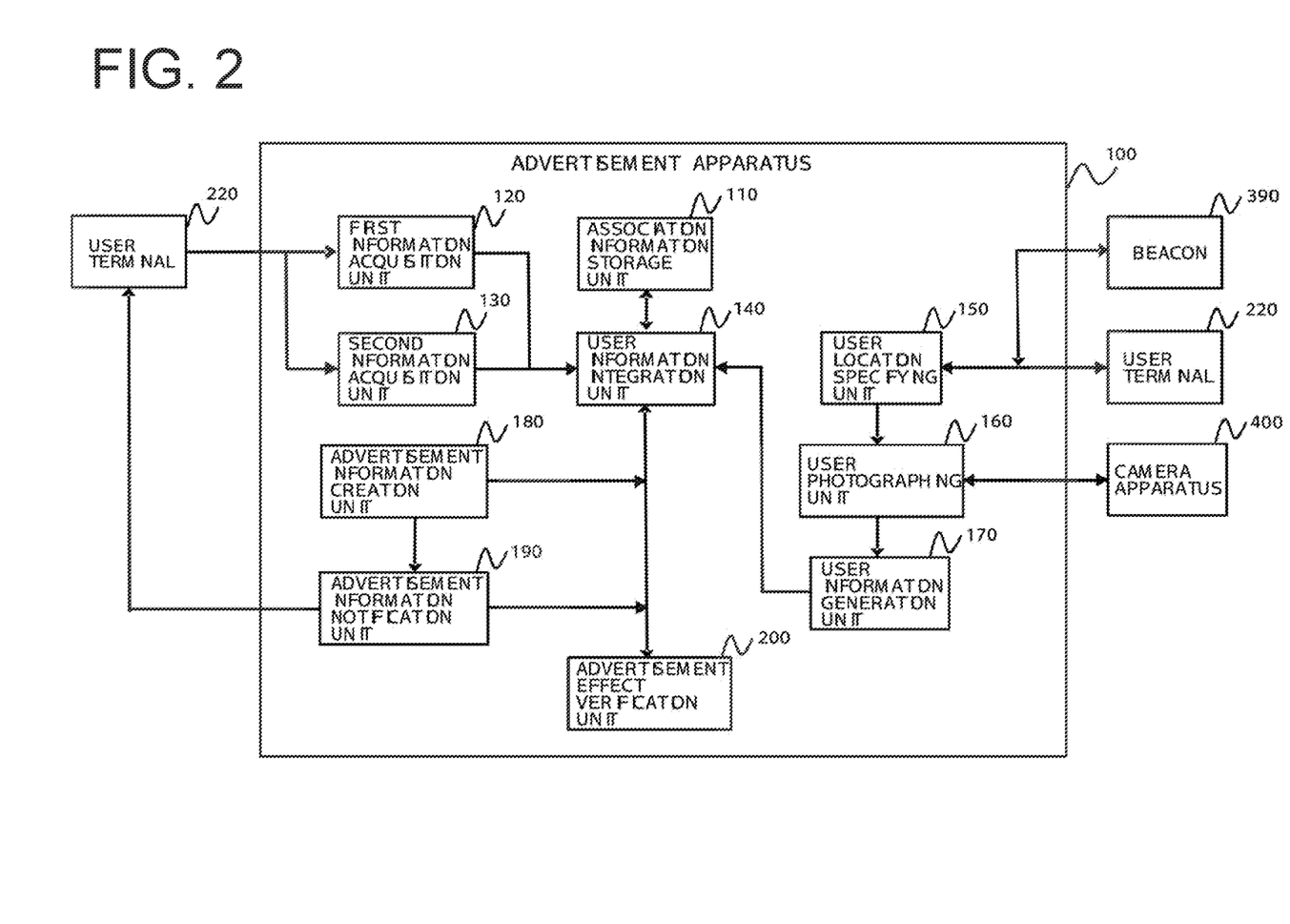
FIG. 2 is a functional block diagram of an advertisement apparatus according to the present embodiment.
Figure 3:
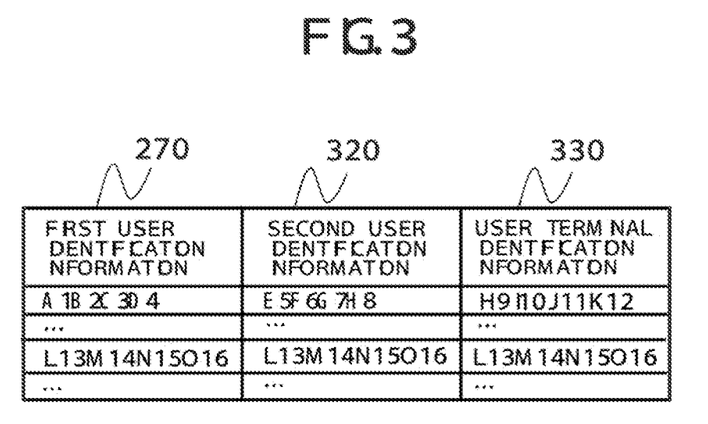
FIG. 3 is a diagram illustrating an example of an association information storage unit according to the present embodiment.

Operation Principle of Advertisement Apparatus According to Present Embodiment An operation principle of an advertisement apparatus (hereinafter, simply referred to as a "present apparatus") 100 according to the present embodiment will be described with reference to FIGS. 1 to 3. FIG. 1 is a diagram for describing a coupling relationship between the present apparatus 100 and other apparatuses, and FIG. 2 is a functional block diagram of the present apparatus 100. FIG. 3 is a diagram illustrating an example of an association information storage unit 110 to be described later.

As illustrated in FIG. 1, the present apparatus 100 is coupled to a user terminal 220 and a beacon 390 or a camera apparatus 400 installed in stores 240 and 290 via a communication network 410. Although not illustrated, the present apparatus 100 may be coupled to the beacon 390 installed outside the stores 240 and 290.

The communication network 410 may be either wired or wireless. A form of the user terminal 220 is not particularly limited as long as the user terminal is a computer having a communication function, but the user terminal is preferably a portable information terminal such as a smartphone. In addition, a business operator 230 who operates the store 240 is different from a business operator 280 who operates the store 290.

In the user terminal 220, a first application 250 for sales promotion provided by one organization 230 is installed. The first application 250 collects purchase behavior information 360 of a user 210 in the store 240, health information 370 of the user 210 provided by the store 240 (one organization 230), and behavior history information 380 of the user 210 related to the store 240 (one organization 230).

In addition, a second application 300 for sales promotion provided by the other organization 280 is installed on the user terminal 220. The second application 300 collects purchase behavior information 360 of the user 210 in the store 290, health information 370 of the user 210 provided by the store 290 (the other organization 280), and behavior history information 380 of the user 210 related to the store 290 (the other organization 280).

Here, since one organization 230 and the other organization 280 are different organizations, the pieces of information 360, 370, and 380 collected by the first application 250 and the pieces of the information 360, 370, and 380 collected by the second application 300 are separately collected.

The present apparatus 100 integrates these pieces of separately collected information by using pieces of user identification information 270 and 320 included therein as keys. Then, the present apparatus 100 analyzes the integrated purchase behavior information 360, health information 370, and behavior history information 380, and creates advertisement information 350 which is assumed to be effective.

The present apparatus 100 provides notification of the advertisement information 350 by designating user terminal identification information 330 and an advertisement application 340 corresponding to the user identification information 270 and 320, and works to increase a desire of purchase of the user 210. In addition, since the present apparatus 100 collects a usage status of the advertisement information 350 as the purchase behavior information 360 of the user 210, it is possible to accurately verify the effect of the advertisement information 350. Note that notification of the advertisement information 350 by the present apparatus 100 may be performed via a server apparatus different from the present apparatus 100, or may be directly performed by the present apparatus 100.

As described above, in consideration of the current statuses 370 and 380 of the user 210 and a preference tendency 360 of the user, the present apparatus 100 can provide notification of an advertisement 350 considered to be highly effective and verify the effect of the advertisement 350.

As illustrated in FIG. 2, the present apparatus 100 includes an association information storage unit 110, a first information acquisition unit 120, a second information acquisition unit 130, a user information integration unit 140, a user location specifying unit 150, a user photographing unit 160, a user information generation unit 170, an advertisement information creation unit 180, an advertisement information notification unit 190, and an advertisement effect verification unit 200.

The association information storage unit 110 stores predetermined first user identification information 270, predetermined second user identification information 320, and user terminal identification information 330 in association with each other. The first user identification information 270 and the second user identification information 320 are pieces of information for identifying the user 210 who operates the user terminal 220, respectively.

The user terminal identification information 330 is information for specifying the user terminal 220 when notification of the advertisement 350 is provided by designating the user terminal 220 and the application installed in the user terminal 220. The user terminal identification information 330 may be referred to as an advertisement ID.

The association information storage unit 110 stores information necessary for the user information integration unit 140 described later to integrate pieces of the user information 260 and 310.

As illustrated in FIG. 3, the association information storage unit 110 stores, for example, the first user identification information 270: "A1B2C3D4", the second user identification information 320: "E5F6G7H8", and the user terminal identification information 330: "H9I10J11K12" in association with each other. As described above, each of the first user identification information 270, the second user identification information 320: "E5F6G7H8", and the user terminal identification information 330 may be different pieces of information.

As illustrated in FIG. 3, the association information storage unit 110 stores, for example, the first user identification information 270: "L13M14N15O16", the second user identification information 320: "L13M14N15O16", and the user terminal identification information 330: "L13M14N15O16" in association with each other. As described above, each of the first user identification information 270, the second user identification information 320: "E5F6G7H8", and the user terminal identification information 330 may be the same information. At this time, the first application 250 and the second application 300 extract the user terminal identification information 330 from the installed user terminal 220, and set the extracted information 330 as the first user identification information 270 and the second user identification information 320.

The first information acquisition unit 120 acquires, from the user terminal 220, the first user information 260, which is unique information of the user 210 related to one organization 230 and is collected by the first application 250 for sales promotion provided by one organization 230 installed in the user terminal 220, and the first user identification information 270 for identifying the user 210 in association with each other.

One organization 230 is a concept including, for example, an electronics retail store, a supermarket, a home center (DIY shop), a sporting goods store, a large-scale commercial facility, a department store, a restaurant, a mail order website, a hospital, and a government office (Ministry of Health, Labour and Welfare, or the like).

The first user information 260 includes the purchase behavior information 360 in one organization 230, related to the user 210, the health information 370 representing a health condition provided from one organization 230, and the behavior history information 380 related to one organization 230. The first user information 260 also includes personal information such as a name, an age, a sex, an address, and a telephone number.

The purchase behavior information 360 includes coupon information used by the user 210 at the time of purchase.

The health information 370 is information that can be obtained by a test (so-called health examination) for checking the health condition of the user 210. The health information 370 may be information including information representing an examination result by an examination kit capable of examining the health condition of the user 210 and meal data. For example, it is information indicating various index values in a blood test. The behavior history information 380 is information including, for example, a store visit route, a use station, a work place, a behavior area on holidays, a store visit time, a stay time, the number of store visits, a product picked up, a movement of a line of sight, a viewing time of an in-store advertisement video, and the like. In addition, the first user information 260 may associate behavior (for example, a behavior of picking up a product or returning it to its original location) history information 380 for examining a product or service before purchase with the purchase history information 360 related to the product or service.

The first application 250 is a tool for sales promotion performed by one organization 230, and collects the purchase behavior information 360, the health information 370, and the behavior history information 380 of the user 210 along with a sales promotion activity performed by one organization 230. In addition, the first application 250 issues, for example, a coupon for sales promotion.

The second information acquisition unit 130 acquires, from the user terminal 220, the second user information 310, which is unique information of the user 210 related to the other organization 280 and is collected by the second application 300 for sales promotion provided by the other organization 280 installed in the user terminal 220, and the second user identification information 320 for identifying the user 210 in association with each other.

The other organization 280 is a concept including, for example, an electronics retail store, a supermarket, a home center (DIY shop), a sporting goods store, a large-scale commercial facility, a department store, a restaurant, a mail order website, a hospital, and a government office (Ministry of Health, Labour and Welfare, or the like).

The second user information 310 includes the purchase behavior information 360 in the other organization 280, related to the user 210, the health information 370 representing the health condition provided from the other organization 280, and the behavior history information 380 related to the other organization 280. The second user information 310 also includes personal information such as a name, an age, a sex, an address, and a telephone number. In addition, the second user information 310 may associate behavior (for example, a behavior of picking up a product or returning it to its original location) history information 380 for examining a product or service before purchase with the purchase history information 360 related to the product or service.

The second application 300 is a tool for sales promotion performed by the other organization 280, and collects the purchase behavior information 360, the health information 370, and the behavior history information 380 of the user 210 along with the sales promotion activity performed by the other organization 280. In addition, the second application 300 issues, for example, a coupon for sales promotion.

The user information integration unit 140 integrates (merges) the first user information 260 associated with the predetermined first user identification information 270 stored in the association information storage unit 110 and the second user information 310 associated with the predetermined second user identification information 320 stored in the association information storage unit 110.

By integrating the first user information 260 and the second user information 310 which are separately collected and have different characteristics or attributes and widening a variety of analysis targets by the advertisement information creation unit 180, more effective analysis and advertisement creation can be performed.

The user location specifying unit 150 specifies a location of the user 210 identified by the first user identification information 270 based on a communication result between the first application 250 and the beacon 390 installed in the store 240 belonging to one organization 230. In addition, the user location specifying unit 150 specifies a location of the user 210 identified by the second user identification information 320 based on a communication result between the second application 300 and the beacon 390 installed in the store 290 belonging to the other organization 280.

The beacon 390 is an electromagnetic wave transmitting apparatus of which an installation location is known in advance. When the first application 250 receives an electromagnetic wave including specific identification information emitted from the beacon 390, it is possible to detect that the user terminal 220 (user 210) is (exists) near a known installation location. A principle of the user location detection by the second application 300 is similar to that by the first application 250.

The user location specifying unit 150 may specify the location of the user 210 based on a communication result between the first application 250 and the beacon 390 or a global positioning system (GPS) installed outside the store 240 belonging to one organization 230. Furthermore, the user location specifying unit 150 may specify the location of the user 210 based on a communication result between the second application 300 and the beacon 390 or the GPS installed outside the store 290 belonging to the other organization 280.

The user photographing unit 160 causes the camera apparatus 400 installed in the store 240 belonging to one organization 230 to photograph the user 210 existing at the location specified by the first user location specifying unit 150, and acquires photographed image information. In addition, the user photographing unit 160 causes the camera apparatus 400 installed in the store 290 belonging to the other organization 280 to photograph the user 210 existing at the location specified by the first user location specifying unit 150, and acquires photographed image information.

In a case where the location of the user 210 in the stores 240 and 290 is known, the user photographing unit 160 performs control to adjust a photographing direction, focus, or the like of the camera apparatus 400 to the user 210, and causes the camera apparatus 400 to photograph the user 210.

The user information generation unit 170 generates, as the first user information 260 or the second user information 310 (purchase behavior information 360), any one or more of a facial expression, the store visit time to the stores 240 and 290, the stay time at the stores 240 and 290, the number of store visits to the stores 240 and 290, the stay purpose at the stores 240 and 290, the viewing time of the advertisement provided in the stores 240 and 290, the product picked up in the stores 240 and 290, the line of sight, the sex, and the age related to the user 210 specified based on the analysis result of the image information acquired by the user photographing unit 160.

The user information generation unit 170 generates, as the first user information 260 or the second user information 310 (behavior history information 380), any one or more of a store visit route to the stores 240 and 290, a use station, a work place, and a behavior range on holidays related to the user 210 as the specification target based on the specification result of the location information by the user location specifying unit 150.

Note that the first user information 260 or the second user information 310 generated by the user information generation unit 170 is a target for data integration processing by the user information integration unit 140. In addition, the first user information 260 or the second user information 310 generated by the user information generation unit 170 is an analysis target for the creation processing of the advertisement 350 by the advertisement information creation unit 180.

The advertisement information creation unit 180 analyzes the first user information 260 and the second user information 310 integrated by the user information integration unit 140. The analysis by the advertisement information creation unit 180 is an analysis for creating the advertisement information 350 that is expected to have a high effect from the purchase behavior information 360, the health information 370, and the behavior history information 380 related to the user 210.

The above analysis is, for example, extracting a user 210 located near the stores 240 and 290, reading a specific purchase trend such as a combination purchase, extracting a user 210 that satisfies this trend, or extracting a user 210 assumed to have specific needs based on a hypothesis, but is not limited thereto. That is, the advertisement information creation unit 180 specifies the user 210 (user identification information 270 and 320) who is highly likely to be guided to purchase a product or service by providing notification of the advertisement information 350.

The advertisement information creation unit 180 creates the advertisement information 350 for providing notification of the advertisement application 340 installed in the user terminal 220 identified by the user terminal identification information 330 associated with the user identification information 270 and 320 specified for providing notification of the advertisement information 350. The advertisement information creation unit 180 may select a matching one from a plurality of pieces of advertisement information 350 prepared in advance in accordance with a condition of the user 210 to which notification of the advertisement information 350 is provided, or may appropriately select and combine components of the advertisement information 350.

The advertisement information creation unit 180 creates the advertisement information 350 that is considered to be suitable for each user 210 segmented based on the above analysis, and notifies the user terminal 220 operated by each user 210 of advertisement information 350 created for each segment. The segmenting method is not particularly limited since it varies in various ways depending on the characteristics of the purchase behavior information 360, the health information 370, and the behavior history information 380 to be analyzed, a viewpoint of analysis, and the like.

The advertisement information notification unit 190 provides notification of the advertisement information 350 created by the advertisement information creation unit 180 by designating the user terminal identification information 330 and the advertisement application 340 specified by the advertisement information creation unit 180. The advertisement information notification unit 190 may instruct a server apparatus that manages a distribution of the advertisement information 350 to the advertisement application 340 to display the advertisement information 350 in the advertisement application 340 installed in the user terminal 220 identified by the user terminal identification information 330. Further, the advertisement information notification unit 190 may perform processing of displaying the advertisement information 350 in the advertisement application 340 installed in the user terminal 220 identified by the user terminal identification information 330.

The advertisement information notification unit 190 may provide notification of the advertisement information 350 to an employee terminal or a store terminal operated by employees of the stores 240 and 290 related to the advertisement information 350. When the employees of the stores 240 and 290 related to the advertisement information 350 recognize the advertisement information 350 in advance, it is possible to appropriately respond to the user 210 who visits the store based on the advertisement information 350, and the effect of the advertisement information 350 can be enhanced.

When the usage status of the advertisement information 350 is included in the purchase behavior information 360, the advertisement effect verification unit 200 verifies the effect of the advertisement information 350 based on the usage status of the advertisement information 350 notification of which is provided by the advertisement information notification unit 190 and the advertisement information 350 included in the user information 260 and 310. It is possible to directly verify the usage status of the advertisement information 350 notification of which is provided to the user 210. The advertisement effect verification unit 200 may verify the effect of the advertisement information 350 based on the advertisement information 350 notification of which is provided by the advertisement information notification unit 190 and the purchase behavior information 360 related to the product or service included in the advertisement information 350.

Based on the operation principle as described above, the present apparatus 100 can provide notification of the advertisement 350 which is considered to be highly effective and measure the effect of the advertisement 350 in consideration of the current states 370 and 380 of the user 210 and the preference tendency 360 of the user.

Figure 4:
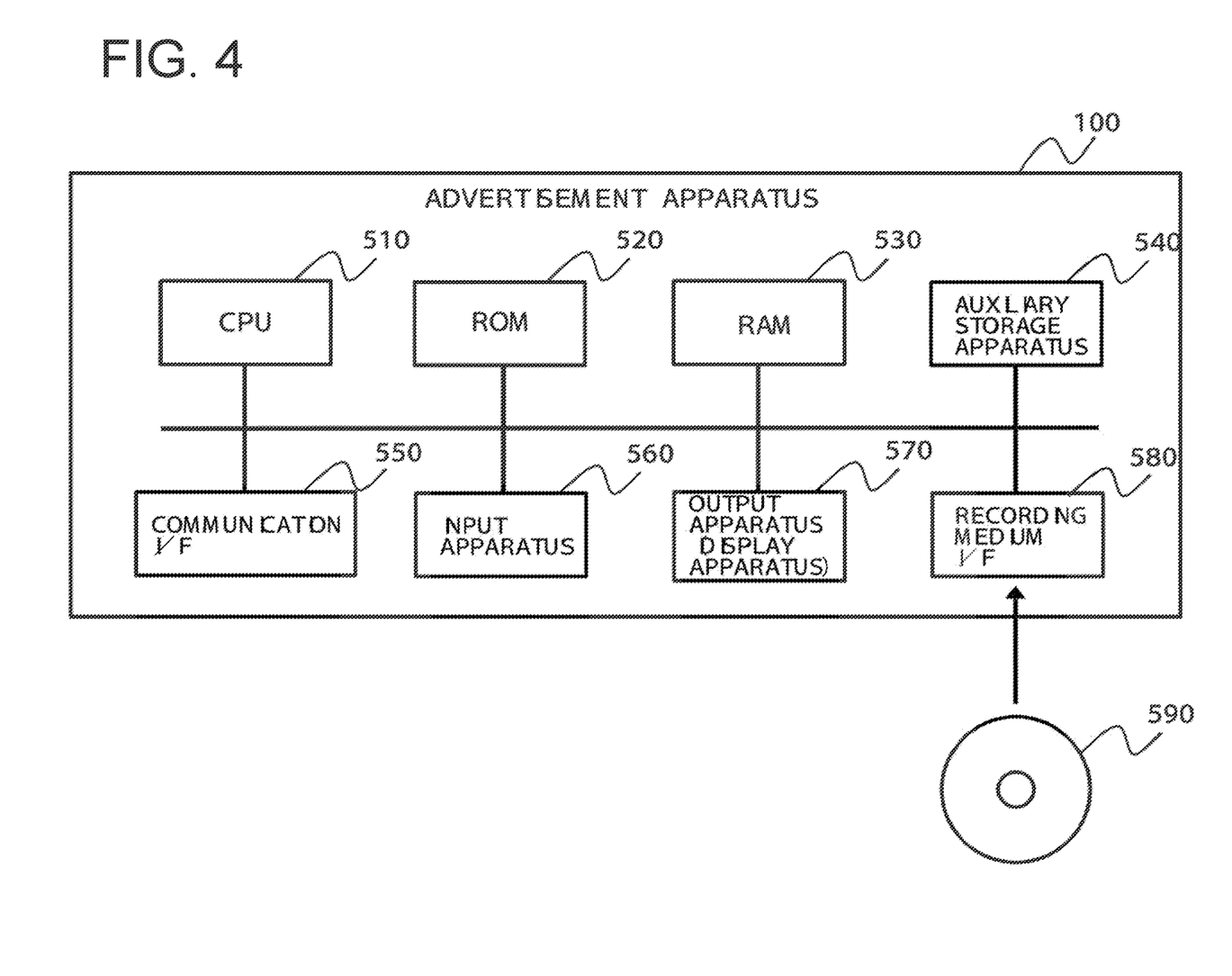
FIG. 4 is a diagram illustrating a hardware configuration example of an advertisement apparatus according to the present embodiment.

Hardware Configuration of Advertisement Apparatus According to Present Embodiment A hardware configuration example of the present apparatus 100 will be described with reference to FIG. 4. FIG. 4 is a diagram illustrating an example of a hardware configuration of the present apparatus 100. As illustrated in FIG. 4, the present apparatus 100 includes a central processing unit (CPU) 510, a read-only memory (ROM) 520, a random access memory (RAM) 530, an auxiliary storage apparatus 540, a communication I/F 550, an input apparatus 560, a display apparatus 570, and a recording medium I/F 580.

The CPU 510 is an apparatus that executes a program stored in the ROM 520, and performs arithmetic processing on data developed (loaded) in the RAM 530 according to an instruction of the program to control the entire present apparatus 100. The ROM 520 stores a program and data executed by the CPU 510. When the CPU 510 executes the program stored in the ROM 520, the RAM 530 develops (loads) the program and data to be executed, and temporarily holds operation data during operation.

The auxiliary storage apparatus 540 is an apparatus that stores an operating system (OS) that is basic software, an application program according to the present embodiment, and the like together with related data. The auxiliary storage apparatus 540 includes a storage unit 110, and is, for example, a hard disk drive (HDD) or a flash memory.

The communication I/F 550 is an interface that is coupled to the communication network 410 such as a wired or wireless local area network (LAN) and the Internet and exchanges data with other apparatuses 220, 390, and 400 that provide a communication function.

The input apparatus 560 is an apparatus such as a keyboard for inputting data to the present apparatus 100. A display apparatus (output apparatus) 570 is an apparatus including a liquid crystal display (LCD) or the like, and functions as a user interface when the user uses the functions of the present apparatus 100 or performs various settings. The recording medium I/F 580 is an interface for transmitting and receiving data to and from the recording medium 590 such as a CD-ROM, a DVD-ROM, and a USB memory.

Each unit included in the present apparatus 100 may be implemented by the CPU 510 executing a program corresponding to each unit stored in the ROM 520 or the auxiliary storage apparatus 540. In addition, each unit included in the present apparatus 100 may be configured to implement processing related to each unit as hardware. In addition, the program according to the present invention may be read from an external server apparatus via the communication I/F 550, or the program according to the present invention may be read from the recording medium 590 via the recording medium I/F 580 to cause the present apparatus 100 to execute the program.

Processing Example by Advertisement Apparatus According to Present Embodiment (1) Data Integration Processing by Present Apparatus 100

Figure 5:
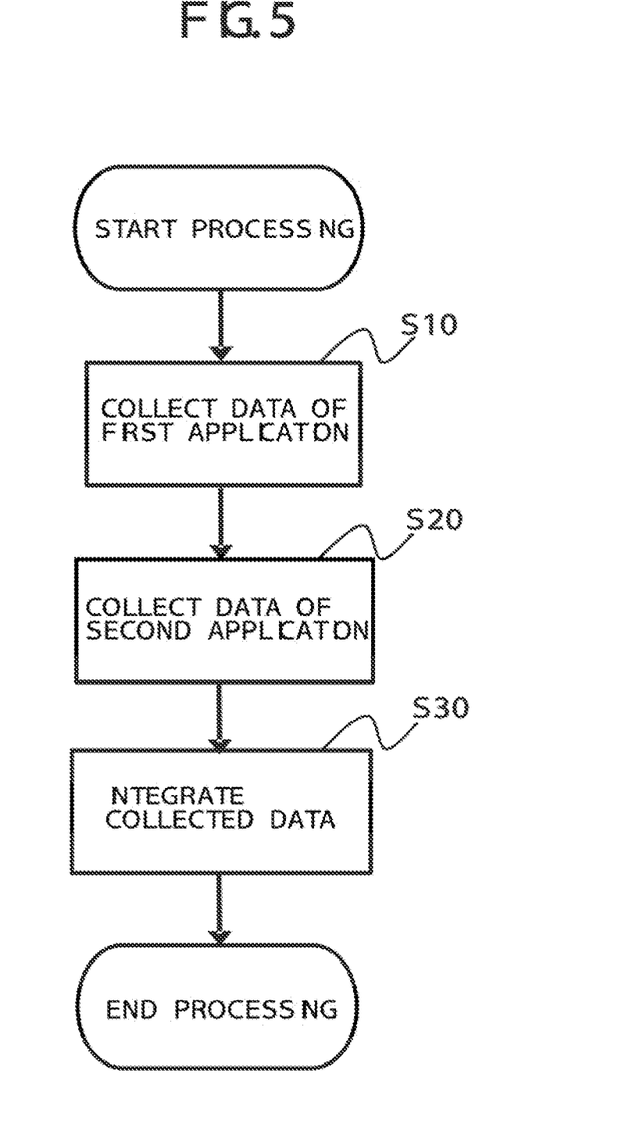
FIG. 5 is a flowchart illustrating a flow of an example of data integration processing by an advertisement apparatus according to the present embodiment.

An example of data integration processing by the present apparatus 100 will be described with reference to FIG. 5. FIG. 5 is a flowchart illustrating a flow of an example of the data integration processing by the present apparatus 100.

In step S10, the first information acquisition unit 120 acquires, from the user terminal 220, the first user information 260 collected by the first application 250 and the first user identification information 270 in association with each other.

The first user information 260 includes the purchase behavior information 360 in one organization 230, related to the user 210, the health information 370 representing a health condition provided from one organization 230, and the behavior history information 380 related to one organization 230. The first user information 260 also includes personal information such as a name, an age, a sex, an address, and a telephone number.

The purchase behavior information 360 includes coupon information used by the user 210 at the time of purchase. The health information 370 is information that can be obtained by a test (so-called health examination) for checking the health condition of the user 210. The health information 370 may be information including information representing an examination result by an examination kit capable of examining the health condition of the user 210 and meal data. For example, it is information indicating various index values in a blood test. The behavior history information 380 is information including, for example, a store visit route, a use station, a work place, a behavior area on holidays, a store visit time, a stay time, the number of store visits, a product picked up, a movement of a line of sight, a viewing time of an in-store advertisement video, and the like.

In step S20, the second information acquisition unit 130 acquires, from the user terminal 220, the second user information 310 collected by the second application 300 and the second user identification information 320 in association with each other.

The second user information 310 includes the purchase behavior information 360 in the other organization 280, related to the user 210, the health information 370 representing the health condition provided from the other organization 280, and the behavior history information 380 related to the other organization 280. The second user information 310 also includes personal information such as a name, an age, a sex, an address, and a telephone number.

Here, the association information storage unit 110 stores predetermined first user identification information 270, predetermined second user identification information 320, and user terminal identification information 330 in association with each other. The association information storage unit 110 stores information necessary for the user information integration unit 140 to integrate the first user information 260 and the second user information 310.

As illustrated in FIG. 3, the association information storage unit 110 stores, for example, the first user identification information 270: "A1B2C3D4", the second user identification information 320: "E5F6G7H8", and the user terminal identification information 330: "H9I10J11K12" in association with each other. As described above, each of the first user identification information 270, the second user identification information 320: "E5F6G7H8", and the user terminal identification information 330 may be different pieces of information.

As illustrated in FIG. 3, the association information storage unit 110 stores, for example, the first user identification information 270: "L13M14N15O16", the second user identification information 320: "L13M14N15O16", and the user terminal identification information 330: "L13M14N15O16" in association with each other. As described above, each of the first user identification information 270, the second user identification information 320: "E5F6G7H8", and the user terminal identification information 330 may be the same information. At this time, the first application 250 and the second application 300 extract the user terminal identification information 330 from the installed user terminal 220, and set the extracted information 330 as the first user identification information 270 and the second user identification information 320.

In S30, the user information integration unit 140 integrates (merges) the first user information 260 associated with the predetermined first user identification information 270 stored in the association information storage unit 110 and the second user information 310 associated with the predetermined second user identification information 320 stored in the association information storage unit 110.

Since one organization 230 and the other organization 280 are different organizations, the pieces of information 360, 370, and 380 collected by the first application 250 and the pieces of the information 360, 370, and 380 collected by the second application 300 are separately collected.

The present apparatus 100 integrates these pieces of separately collected information by using the pieces of user identification information 270 and 320 included therein as keys, and enables creation of the advertisement information 350 assumed to be effective based on the integrated pieces of information 360, 370, and 380.

(2) User Information Generation Processing by Present Apparatus 100

Figure 6:
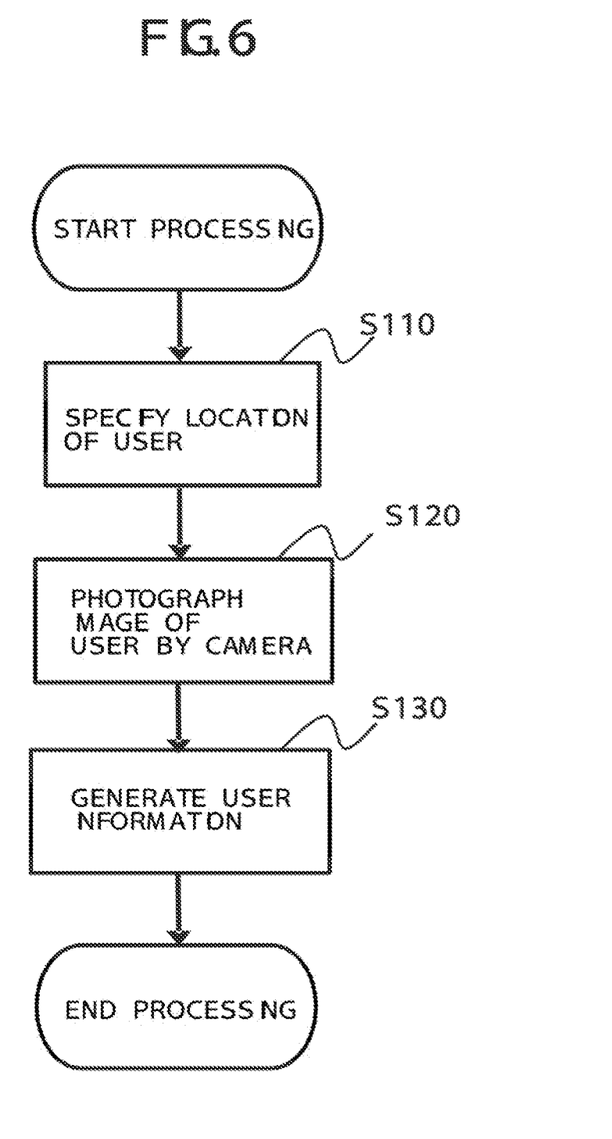
FIG. 6 is a flowchart illustrating a flow of an example of user information generation processing by an advertisement apparatus according to the present embodiment.
Figure 7:
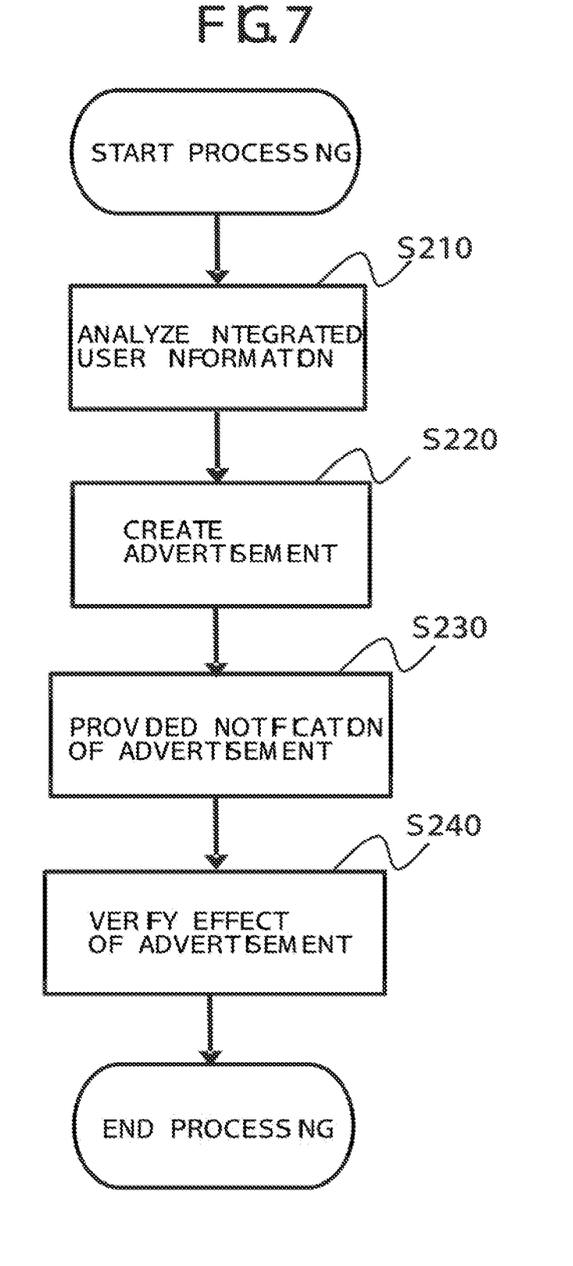
FIG. 7 is a flowchart illustrating a flow of an example of advertisement creation processing by an advertisement apparatus according to the present embodiment.

An example of user information generation processing by the present apparatus 100 will be described with reference to FIG. 6. FIG. 6 is a flowchart illustrating a flow of an example of the user information generation processing by the present apparatus 100.

In S110, the user location specifying unit 150 specifies the location of the user 210 identified by the first user identification information 270 based on a communication result between the first application 250 and the beacon 390 installed in the store 240 belonging to one organization 230. Similarly, the user location specifying unit 150 specifies the location of the user 210 identified by the second user identification information 320 based on a communication result between the second application 300 and the beacon 390 installed in the store 290 belonging to the other organization 280.

When the first application 250 receives an electromagnetic wave including specific identification information emitted from the beacon 390, it is possible to detect that the user terminal 220 (user 210) is (exists) near a known installation location. A principle of the user location detection by the second application 300 is similar to that by the first application 250.

In S120, the user photographing unit 160 causes the camera apparatus 400 installed in the store 240 belonging to one organization 230 to photograph the user 210 existing at the location specified in S110, and acquires photographed image information. Similarly, the user photographing unit 160 causes the camera apparatus 400 installed in the store 290 belonging to the other organization 280 to photograph the user 210 existing at the location specified in S110, and acquires photographed image information.

In a case where the location of the user 210 in the stores 240 and 290 is known, the user photographing unit 160 performs control to adjust a photographing direction, focus, or the like of the camera apparatus 400 to the user 210, and causes the camera apparatus 400 to photograph the user 210.

In S130, the user information generation unit 170 generates, as the first user information 260 or the second user information 310 (purchase behavior information 360), any one or more of a facial expression, the store visit time to the stores 240 and 290, the stay time at the stores 240 and 290, the number of store visits to the stores 240 and 290, the stay purpose at the stores 240 and 290, the viewing time of the advertisement provided in the stores 240 and 290, the product picked up in the stores 240 and 290, the line of sight, the sex, and the age related to the user 210 specified based on the analysis result of the image information acquired in S120.

Here, in S110, the user location specifying unit 150 may specify the location of the user 210 based on a communication result between the first application 250 and the beacon 390 or a global positioning system (GPS) installed outside the store 240 belonging to one organization 230. Similarly, in S110, the user location specifying unit 150 may specify the location of the user 210 based on a communication result between the second application 300 and the beacon 390 or the GPS installed outside the store 290 belonging to the other organization 280.

When the processing of S110 is performed, the processing of S120 is skipped, and in S130, the user information generation unit 170 generates, as the first user information 260 or the second user information 310 (behavior history information 380), any one or more of a store visit route to the stores 240 and 290, a use station, a work place, and a behavior range on holidays related to the user 210 as the specification target based on the specification result of the location information in S110.

Note that the first user information 260 or the second user information 310 generated in S130 is a target for data integration processing by the user information integration unit 140. In addition, the first user information 260 or the second user information 310 generated in S130 is an analysis target for the creation processing of the advertisement information 350 by the advertisement information creation unit 180.

(3) Advertisement Creation Processing by Present Apparatus 100

An example of advertisement creation processing by the present apparatus 100 will be described with reference to FIG. 6. FIG. 6 is a flowchart illustrating a flow of an example of the advertisement creation processing by the present apparatus 100.

In S210, the advertisement information creation unit 180 analyzes the first user information 260 and the second user information 310 integrated in S30. The analysis by the advertisement information creation unit 180 is an analysis for creating the advertisement information 350 that is expected to have a high effect from the purchase behavior information 360, the health information 370, and the behavior history information 380 related to the user 210.

The above analysis is, for example, extracting a user 210 located near the stores 240 and 290, reading a specific purchase trend such as a combination purchase, extracting a user 210 that satisfies this trend, or extracting a user 210 assumed to have specific needs based on a hypothesis, but is not limited thereto. That is, the advertisement information creation unit 180 specifies the user 210 (user identification information 270 and 320) who is highly likely to be guided to purchase a product or service by providing notification of the advertisement information 350.

In S220, the advertisement information creation unit 180 creates the advertisement information 350 for providing notification of the advertisement application 340 installed in the user terminal 220 identified by the user terminal identification information 330 associated with pieces of the user identification information 270 and 320 specified for providing notification of the advertisement information 350.

The advertisement information creation unit 180 may select a matching one from a plurality of pieces of advertisement information 350 prepared in advance in accordance with a condition of the user 210 to which notification of the advertisement information 350 is provided, or may appropriately select and combine components of the advertisement information 350.

The advertisement information creation unit 180 creates the advertisement information 350 that is considered to be suitable for each user 210 segmented based on the above analysis, and notifies the user terminal 220 operated by each user 210 of advertisement information 350 created for each segment. The segmenting method is not particularly limited since it varies in various ways depending on the characteristics of the purchase behavior information 360, the health information 370, and the behavior history information 380 to be analyzed, a viewpoint of analysis, and the like.

In S230, the advertisement information notification unit 190 provides notification of the advertisement information 350 created in S220 by designating the user terminal identification information 330 and the advertisement application 340 specified in S220. The advertisement information notification unit 190 may instruct a server apparatus that manages a distribution of the advertisement information 350 to the advertisement application 340 to display the advertisement information 350 in the advertisement application 340 installed in the user terminal 220 identified by the user terminal identification information 330.

Further, the advertisement information notification unit 190 may perform processing of displaying the advertisement information 350 in the advertisement application 340 installed in the user terminal 220 identified by the user terminal identification information 330.

The advertisement information notification unit 190 may provide notification of the advertisement information 350 to an employee terminal or a store terminal operated by employees of the stores 240 and 290 related to the advertisement information 350. When the employees of the stores 240 and 290 related to the advertisement information 350 recognize the advertisement information 350 in advance, it is possible to appropriately respond to the user 210 who visits the store based on the advertisement information 350, and the effect of the advertisement information 350 can be enhanced.

In S240, when the usage status of the advertisement information 350 is included in the purchase behavior information 360, the advertisement effect verification unit 200 verifies the effect of the advertisement information 350 based on the usage statuses of the advertisement information 350 notification of which is provided in S230 and the advertisement information 350 included in the user information 260 and 310. It is possible to directly verify the usage status of the advertisement information 350 notification of which is provided to the user 210. The advertisement effect verification unit 200 may verify the effect of the advertisement information 350 based on the advertisement information 350 notification of which is provided by the advertisement information notification unit 190 and the purchase behavior information 360 related to the product or service included in the advertisement information 350.

Based on the information processing as described above, the present apparatus 100 can provide notification of the advertisement 350 which is considered to be highly effective and measure the effect of the advertisement 350 in consideration of the current states 370 and 380 of the user 210 and the preference tendency 360 of the user.

Although the embodiments of the present invention have been described in detail above, the present invention is not limited to the specific embodiments, and various modifications and changes can be made within the scope of the gist of the present invention described in the claims.

What is claimed is:

1. An advertisement apparatus comprising: a memory having one or more instructions stored thereon;
a processor configured to execute the one or more instructions to:
specify a location of a user as location information based on receiving a wave emitted by at least one beacon connected to the advertisement apparatus;
acquire first user information based on the location information, wherein the first user information is unique information of the user related to one organization and is collected by a first application for sales promotion provided by the one organization installed in a user terminal, and first user identification information for identifying the user in association with each other, from the user terminal;
acquire second user information based on the location information, wherein the second user information is unique information of the user related to the other organization and is collected by a second application for sales promotion provided by the other organization installed in the user terminal, and second user identification information for identifying the user in association with each other, from the user terminal;
store predetermined first user identification information, predetermined second user identification information, and user terminal identification information that are pieces of information for specifying the user terminal when notification of an advertisement is provided by designating the user terminal and an application installed in the user terminal in association with each other;
integrate the first user information associated with the predetermined first user identification information and the second user information associated with the predetermined second user identification information;
create advertisement information for providing notification of one advertisement application capable of receiving the advertisement installed on the user terminal identified by the user terminal identification information associated with the predetermined first user identification information and the predetermined second user identification information based on an analysis result obtained by analyzing the first user information and the second user information, wherein the analyzing creates the advertisement information that is expected to have a high effect based on the first user information and the second user information;
provide notification of the advertisement information created by designating the user terminal identification information and the one advertisement application;
cause a camera apparatus installed in the store belonging to the one organization or a camera apparatus installed in the store belonging to the other organization to photograph an image of the user existing at the location specified, and acquire photographed image information;
generate as the first user information or the second user information an one or more of a facial expression a store visit time to the store a stay time at the store, the number of store visits to the store, a stay purpose at the store, a viewing time of an advertisement provided in the store, a product picked up in the store, a line of sight, a sex, and an age related to the user specific based on an analysis result of the image information; and
wherein specifying the location of the user comprises specifying the location as identified by the first user identification information or the second user identification information based on a communication result between the first application and at least one of the at least one beacon installed in a store belonging to the one organization or based on a communication result between the second application and at least one of the at least one beacon installed in a store belonging to the other organization.

2. The advertisement apparatus according to claim 1, wherein
the first user information includes purchase behavior information in the one organization, related to the user, health information representing a health condition provided from the one organization, and behavior history information related to the one organization, and
the second user information includes purchase behavior information in the other organization, related to the user, health information representing a health condition provided from the other organization, and behavior history information related to the other organization.

3. The advertisement apparatus according to claim 1, wherein the first user identification information and the second user identification information are the pieces of user terminal identification information related to the user terminal which is an information acquisition source.

4. The advertisement apparatus according to claim 1, wherein the processor is further configured to execute the one or more instructions to:
generate, as the first user information or the second user information, any one or more of a store visit route to the store, a use station, a work place, and a behavior range on holidays related to the user specified based on a specification result.

5. An advertisement method comprising:
specifying a location of a user as location information based on receiving a wave emitted by at least one beacon connected to the advertisement apparatus;
acquiring first user information based on the location information, wherein the first user information is unique information of a user related to one organization and is collected by a first application for sales promotion provided by the one organization installed in a user terminal, and first user identification information for identifying the user in association with each other, from the user terminal;
acquiring second user information based on the location information, wherein the second user information is unique information of the user related to the other organization and is collected by a second application for sales promotion provided by the other organization installed in the user terminal, and second user identification information for identifying the user in association with each other, from the user terminal;
integrating the first user information associated with predetermined first user identification information and the second user information associated with predetermined second user identification information stored in an association information storage that stores the predetermined first user identification information, the predetermined second user identification information, and user terminal identification information that is information for specifying the user terminal in association with each other, when notification of an advertisement is provided by designating the user terminal and an application installed in the user terminal;
creating advertisement information for providing notification of one advertisement application capable of receiving the advertisement installed on the user terminal identified by the user terminal identification information associated with the predetermined first user identification information and the predetermined second user identification information based on an analysis result obtained by analyzing the first user information and the second user information integrated,
wherein the analyzing creates the advertisement information that is expected to have a high effect based on the first user information and the second user information;
providing notification of the advertisement information created by designating the user terminal identification information and the one advertisement application;
causing a camera apparatus installed in the store belonging to the one organization or a camera apparatus installed in the store belonging to the other organization to photograph an image of the user existing at the location specified, and acquire photographed image information;
generating, as the first user information or the second user information, any one or more of a facial expression, a store visit time to the store, a stay time at the store, the number of store visits to the store, a stay purpose at the store, a viewing time of an advertisement provided in the store, a product picked up in the store, a line of sight, a sex, and an age related to the user specified based on an analysis result of the image information; and
wherein specifying the location of the user comprises specifying the location as identified by the first user identification information or the second user identification information based on a communication result between the first application and at least one of the at least one beacon installed in a store belong in to the one organization or based on a communication result between the second application and at least one of the at least one beacon installed in a store belonging to the other organization.

6. The advertisement method according to claim 5, wherein
the first user information includes purchase behavior information in the one organization, related to the user, health information representing a health condition provided from the one organization, and behavior history information related to the one organization, and
the second user information includes purchase behavior information in the other organization, related to the user, health information representing a health condition provided from the other organization, and behavior history information related to the other organization.

7. The advertisement method according to claim 5, wherein the first user identification information acquired and the second user identification information acquired are the pieces of user terminal identification information related to the user terminal which is an information acquisition source.

8. The advertisement method according to claim 5, further comprising:
generating as the first user information or the second user information, any one or more of a store visit route to the store, a use station, a work place, and a behavior range on holidays related to the user specified based on a specification result.

* * * * *